June 21, 1960  W. H. EBURN, JR  2,941,460
ERECTING MECHANISM FOR PHOTOGRAPHIC APPARATUS
Filed Nov. 14, 1957  3 Sheets-Sheet 1

INVENTOR.
William H. Eburn, Jr.
BY
Brown and Mikulka
Attorneys

June 21, 1960     W. H. EBURN, JR     2,941,460
ERECTING MECHANISM FOR PHOTOGRAPHIC APPARATUS Filed Nov. 14, 1957     3 Sheets-Sheet 3

INVENTOR.
William H. Eburn, Jr.
BY
Brown and Mikulka
Attorneys

United States Patent Office 2,941,460
Patented June 21, 1960

2,941,460
ERECTING MECHANISM FOR PHOTOGRAPHIC APPARATUS

William H. Eburn, Jr., East Weymouth, Mass., assignor to Polaroid Corporation, Cambridge, Mass., a corporation of Delaware Filed Nov. 14, 1957, Ser. No. 696,504

12 Claims. (Cl. 95—40)

This invention relates in general to camera mechanisms and, more specifically, to erecting mechanisms for bellows type folding cameras.

One object of this invention is to provide novel means for erecting the elements of a folding camera, said means including as an integral part thereof novel means for springing open a folding camera.

Other objects are to provide novel means for rigidly locking elements of a folding camera when said camera is at full extension, said means being integral with said erecting means; to provide a novel means for erecting and locking at full tension elements of a folding camera by means of a cam and double-cam follower linkage; and to provide a mechanism of the class described which is simple to construct, to assemble and operate.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of this invention, reference should be had to the following detailed description taken in connection with the accompanying drawings wherein.

Figure 1:
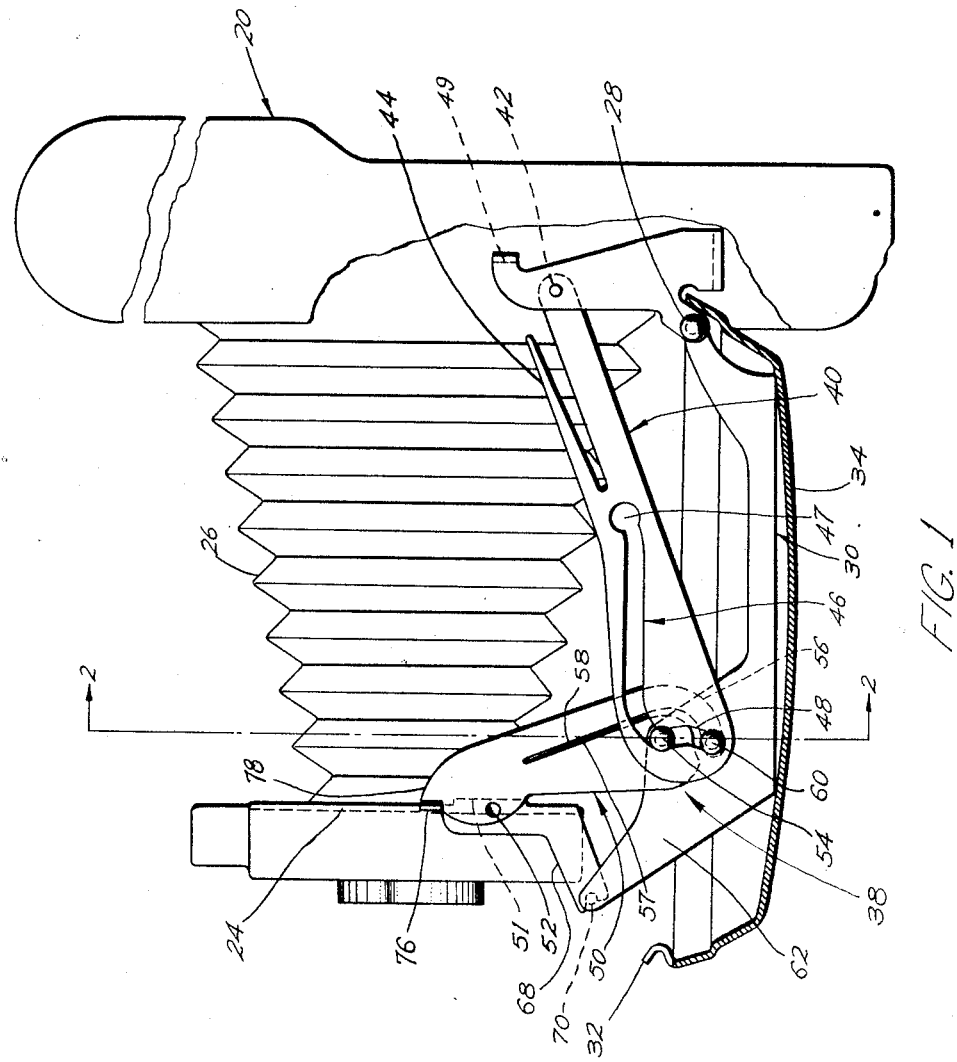
Figure 1 is a fragmentary side elevation view, partly in section, of the parts of a camera, embodying this invention.
Figure 2:
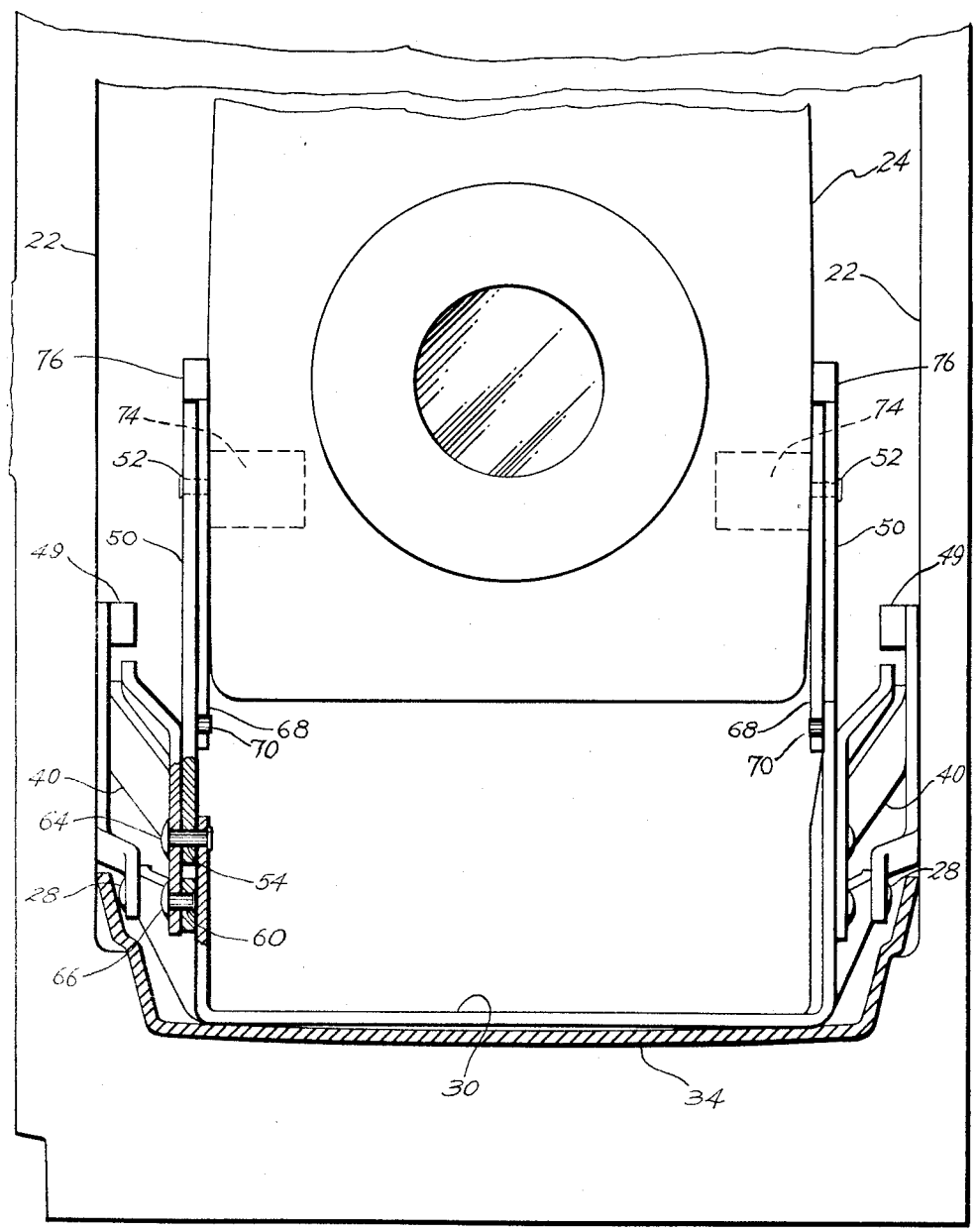
Fig. 2 is a fragmentary front elevation view of the camera of Fig 1 shown partially in section taken along the line 2—2 of Fig. 1.
Figure 3:
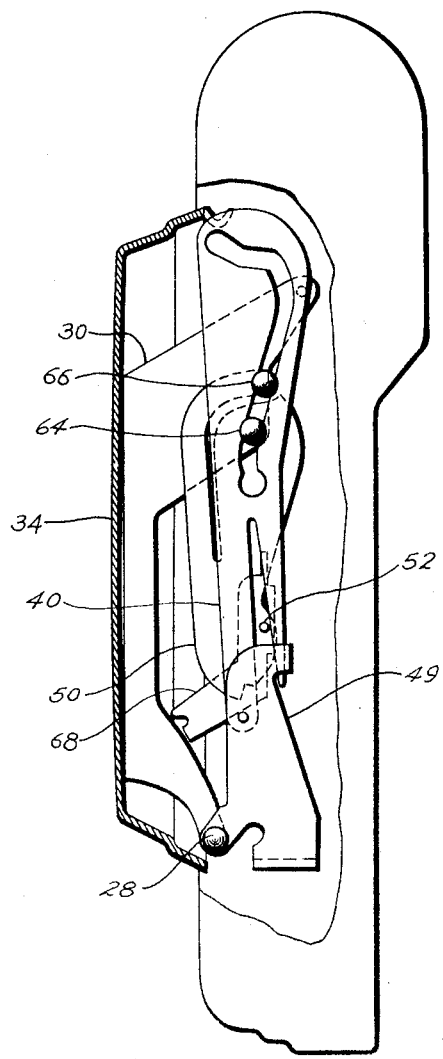
Fig. 3 is a side elevation view in section of the camera of Fig. 1 shown with the parts completely folded.

Referring now to the drawings wherein like numerals denote like parts, the elements are shown in Figs. 1 and 3 as they would appear from a position at the side of the camera. The direction of movement and the location of the elements as hereinafter described are those which would be observed when said elements are viewed from the above-described postion, the descriptive language being in accordance with said position of observation and not in any sense a limitation otherwise. In the figures there is shown a handheld camera of the folding type, such as the "Polaroid Highlander Land camera," which incorporates an embodiment of the erecting mechanism comprising the present invention. As a means for supporting and enclosing various elements of the camera, a housing, generally designated as 20 is provided, housing 20 comprising a container in which photosensitive material may be disposed, said container having an opening 22 on one side thereof through which other elements of the camera may be extended. Operatively connected to said opening 22 in housing 20 is a siutable means for mounting a lens and shutter assembly, such as lens board 24, which shutter assembly may be of conventional design but which is preferably of the type disclosed in U.S. Patent No. 2,662,457, issued to M. N Fairbank on December 15, 1953. A suitable extensible bellows 26, attached at one end to the periphery of opening 22 and fixed at its other end to said lens board 24, provides an operative connection between housing 20 and lens board 24. Swingingly attached to housing 20 on the same side therof as opening 22, as at pivot 28, is a supporting means such as camera bed 30 which is adapted to be moved to an open position to provide support for lens board 24, and adapted to be moved to a closed position against housing 20 to provide protection for the lens and shutter assembly of lens board 24. To improve the appearance of the camera as well as to provide additional protection to the parts of the camera when in a folded position as in Fig. 3, a cover 34 is attached to the exterior surface of bed 30, cover 34 providing a snug fit against housing 20 when bed 30 is moved to a closed position. Cover 34 is provided at one end opposite pivot 28 with spring means 32 to latch said end to housing 20.

As an operative coupling means for erecting and locking lens board 24 into a predetermined position, cam and double-cam follower linkages, designated generally by 38, are provided, one such linkage on each side of the bellows. Reference hereinafter will be made to linkage 38 in the singular, only one such linkage 38 being shown in Fig. 1. In the illustrated embodiment, linkage 38 comprises a first element such as strut 40, a second element such as connected brace 50, brace pivot 54 and stud 60.

Strut 40 is pivotally attached to the side of housing 20, for example, by strut pivot 42. Strut 40 is shaped to provide a resilient arm 44 integral therewith and it is desirable that arm 44 be shaped to extend toward housing 20 and parallel to the long axis of strut 40. The body of strut 40 is provided with an arcuate guide slot, as shown for example at 46, which extends essentially radially with respect to the center of pivotal motion (i.e., strut pivot 42) of strut 40. That end 47 of slot 46 closest to pivot 42 is adaped to provide a circular configuration; the other end of slot 46 terminates in a V-shaped foot 48, the apex of the V being directed essentially toward the said center of pivotal motion of strut 40. With the exception of the circular configuration at 47, the sides of slot 46 are parallel throughout its length.

The slot 46 functions as a cam surface to control the erecting movements of brace 50 and strut 40. Tab 49 is provided on the interior side wall of housing 20, projecting laterally therefrom and directed towards the opening 22 in housing 20, being positioned above strut pivot 42 such that on closure of the camera as in Fig. 3, resilient arm 44 abuts tab 49 and is capable of being under lateral compression thereagainst.

Lens board 24 is provided with brace tab 51 adapted to provide a surface for attachment for means to support lens board 24. As a means for connecting lens board 24 to bed 30, brace 50 is attached to brace tab 51, for example, by lens board pivot 52. Brace 50 is pivotally connected at its other end to extension 62 of bed 30 as by brace pivot 54. Brace 50 is shaped to provide a resilient arcuate arm 56 integral therewith, arm 56 extending parallel to edge 57 of brace 50 and separated from edge 57 by arcuate slit 58. Stud 60 is fixed to the tip of arm 56.

As a means for slidably connecting brace 50 with strut 40, both brace pivot 54 and stud 60 are adapted to be freely slidable along slot 46. Brace pivot 54, pivotally connecting bed extension 62 and brace 50, protrudes laterally from bed extension 62 into guide slot 46 of strut 40; stud 60 protrudes laterally from the tip of arm 56 into guide slot 46 of strut 40. As a means to secure brace pivot 54 and stud 60 within the confines of guide slot 46, both pivot 54 and stud 60 being of equal diameter, may be provided with heads 64 and 66, respectively, both pivot 54 and stud 60 comprising substantially a double cam follower responsive to the cam surface of slot 46. To provide for easy assembly, the circular configuration of end 47 of slot 46 may be provided with a diameter substantially greater than the diameter of heads 64 and 66. As a means for limiting the forward mobility of the lens and shutter assembly, a fork 68 is provided on each side of lens board 24, rigidly extending from and perpendicular to the plane of lens board 24; fork 68 being adapted to be engageable upon a corresponding stop pin 70 mounted on bed extension 62. Fork 68 may be produced as an integral part of lens board 24, for instance by cutting out a section of a metal lens board as at 74 and bending the metal to a position as required.

Stop tabs 76 are attached to lens board 24, extending from the sides and in the plane of lens board 24; and may be produced so as to be integral with lens board 24 by an operation similar to that required to produce fork 68. As a means to provide vertical stability of lens board 24 during part of the erecting movement and to insure proper engagement of fork 68 upon stop pin 70, brace 50 may be provided with a nose 78 adapted to be strikeable upon stop tab 76 at a predetermined position.

As may be seen from the foregoing disclosure, the parts are comparatively limited in number and complexity and should prove simple to construct and assemble.

The operation of the camera mechanism thus far disclosed is as follows:

Starting with the camera mechanism in a closed position, as in Fig. 3, spring means 32 is released, unlatching camera bed 30 from housing 20. Resilient arms 44 of struts 40, being thus released from compression against tabs 49, expand laterally, springing bed 30 out from housing 20 and pivotally about pivots 28, coming to a position in which bed 30 may be grasped and drawn down to the position shown in Figure 1. The motion of bed 30 pivoting out from housing 20 in an arc pulls brace pivot 54 and stud 60 along arcuate guide slot 46 toward V-shaped foot 48. The pivotal motion of bed 30 is transmitted to strut 40 by means of brace pivot 54 and, therefore, correspondingly to brace 50 through means for slidably connecting brace 50 with strut 40, comprising both brace pivot 54 and stud 60, moving along a path defined by the configuration of the guide slot 46. It is to be understood that the configuration of guide slot 46 may be varied to impart a desired or particular direction of motion to pivot 54 and stud 60 traversing therein. Because brace 50 is also pivoted to lens board 24, the transmitted motion of pivoting bed 30 resultantly moves lens board 24 forward from a position wherein the plane of said lens board was substantially parallel to the plane of housing 20 and extends bellows 26.

As stud 60 enters V-shaped foot 48 of a respective guide slot 46, there is an abrupt change in the direction of motion of stud 60 in conformation with the beginning configuration of foot 48. This change in direction of motion sets up a mechanical couple across brace pivot 54 and stud 60, the former not yet having changed its direction of motion; this couple acts to pivotally erect connected brace 50 toward an upright position, as in Fig. 1. As stud 60 is moved further into V-shaped foot 48, the motion of stud 60 over the apex of the V in foot 48 causes a lateral stress upon arcuate resilient arm 56 to which stud 60 is fixed, forcing an angular outward displacement of arm 56 from brace 50. It is desirable that the lateral stress upon arm 56 reaches its maximum at a point lying between the apex and terminal end of the V in foot 48.

The further motion of stud 60 to the end of guide slot 46 carries stud 60 past the apex of the V in foot 48 and stud 60 is forced into a terminal position. As stud 60 moves toward this terminal position, the force of the movement of bed 30 is exerted by stud 60 affixed to bed 30 upon foot 48 in a forward direction. The resultant of this force acting upon a given configuration of foot 48 now forces brace 50 to move upward relative to its position to bed 30. The lateral stress upon resilient arm 56, is, at this point, decreased, enough stress remaining to maintain stud 60 in a fixed position relative to brace 50. As stud 60 is moved to the end of the V-shaped foot 48, brace pivot 54 enters the beginning configuration of said foot 48. The direction of motion of brace pivot 54 and stud 60 now being the same, the couple erecting brace 50 ceases and brace 50 now becomes fully erect.

Without providing the force equivalent of the maximum lateral stress across resilient arm 56, stud 60 cannot be moved back over the apex of the V in foot 48. Consequently, in the absence of such force the positioning of brace pivot 54 and stud 60 in V-shaped foot 48 provides a rigid locking means for the entire mechanism integral with the erecting brace 50 and strut 40.

Simultaneously with the erection of brace 50, the forward movement of lens board 24, pivoting at lens board pivots 52 and impelled by the erecting movement of brace 50, is stopped by the engagement of forks 68 on stop pins 70. The plane of the lens board 24 has been maintained in a substantial parallelism with the plane of the housing 20 by the equal extensibility of the sides of bellows 26. However, as bellows 26 may prove incapable of supporting the weight of lens board 24 with the shutter and lens assembly at or near full extension, lens board 24 may sag out of parallelism with housing 20. The nose 78 provided at an end of brace 50, being adapted to abut stop tab 76 at or near full extension, will serve to correct any such sagging tendency and thus insure the proper engagement of forks 68 with corresponding stop pins 70, so that at full extension, as in Fig. 1, a proper space relationship of lens board 24 and housing 20 is established.

The mechanism may be unlocked by providing the necessary force to stress arcuate resilient arms 56 and move stud 60 back toward the apex of the V in foot 48. This force may be provided by pressing upon struts 40 simultaneously in the direction of camera bed 30. As the erecting mechanism is thus unlocked, bed 30 may be grasped and pushed pivotally toward the closed position, as in Fig. 3. The motion of bed 30, transmitted through pivot-and-stud and slot linkage 38, causes the parts to move reversibly of their opening movements. The motion of bed 30 finally compresses resilient arms 44 against tabs 49 attached to housing 20, restoring the initial lateral compression upon resilient arms 44. Spring means 32 latches camera bed 30 closed to housing 20, thus maintaining the parts in their folded position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An apparatus for reversibly extending camera elements from one another comprising, in combination, a camera housing, lens-mounting means and means for axially displacing said lens-mounting means from said housing, the last-named means including a camera bed for supporting said lens-mounting means, said bed being connected to said housing for pivotal movement with respect thereto, first brace means for pivotally connecting said lens-mounting means with said bed and for resiliently locking said lens-mounting means relative to said bed, said first brace means being shaped to provide a resilient arcuate arm integral therewith, second brace means for connecting said housing to said first brace means, said second brace means being pivotally connected to said housing and comprising a guide means for controlling motions of said first brace means and said lens-mounting means, connecting means in pivotal and slidable engagement with said guide means and comprising a pivot for connecting the body of said first brace means with said bed, said connecting means also comprising a stud attached to the end of said resilient arm for connecting said first brace means with said second brace means, pivotal motion of said bed being translated by sliding and pivotal motion of said connecting means into axially displacing motion of said lens-mounting means with respect to said housing in conformance with a configuration of said guide means.

2. An apparatus for reversibly extending camera elements from one another comprising, in combination, a camera housing, lens-mounting means and means for axially displacing said lens-mounting means from said housing, the last-named means comprising a camera bed for supporting said lens-mounting means, said bed being connected to said housing for pivotal movement with respect thereto, first brace means for pivotally connecting said lens-mounting means with said bed and for resiliently locking said lens-mounting means with relation to said bed, second brace means for connecting said housing to said first brace means, said second brace means being pivotally connected to said housing and comprising a cam surface for controlling motions of said first brace means and said lens-mounting means, connecting means comprising at least two cam followers in pivotal and slidable engagement with said cam surface for connecting said first brace means with said second brace means, pivotal motion of said bed being translated by sliding and pivotal motion of said connecting means into axially displacing motion of said lens-mounting means with respect to said housing in conformance with a configuration of said cam surface.

3. An apparatus for reversibly extending camera elements from one another comprising, in combination, a camera housing, lens-mounting means and means for axially displacing said lens-mounting means from said housing, the last-named means comprising a camera bed for supporting said lens-mounting means, said bed being connected to said housing for pivotal movement with respect thereto, first brace means for pivotally connecting said lens-mounting means with said bed and for resiliently locking said lens-mounting means with relation to said bed, second brace means for connecting said housing to said first brace means, said second brace means being pivotally connected to said housing and comprising an arcuate cam surface for controlling motions of said first brace means and said lens-mounting means, said cam surface extending substantially radially with respect to the center of pivotal motion of said second brace means, connecting means for connecting said first brace means with said second brace means, said connecting means comprising at least two cam followers in engagement with and responsive to a configuration of said cam surface, pivotal motion of said bed being translataed by sliding and pivotal motion of said connecting means into axially displacing motion of said lens-mounting means with respect to said housing in conformance with a configuration of said cam surface.

4. An apparatus for reversibly extending camera elements from one another as defined in claim 2, wherein said first brace means is shaped to provide a resilient arcuate arm integral therewith, said cam followers comprising, respectively, a pivot and a stud, said pivot protruding laterally from said bed for connecting the body of said first brace means with said bed, said pivot being in engagement with said cam surface, said stud being attached to the end portion of said resilient arm and protruding laterally therefrom into engagement with said cam surface.

5. An apparatus for reversibly extending camera elements from one another comprising in combination a camera housing, lens-mounting means and means for axially displacing said lens-mounting means from said housing, the last-named means comprising a camera bed pivotally connected to said housing, first brace means connecting said lens-mounting means with said bed, said first brace means shaped to provide a resilient arcuate arm integral therewith, said second brace means being pivotally connected to said housing and comprising a guide means shaped to provide an arcuate cam surface terminating in a V-shaped foot, connecting means connecting said first brace means with said second brace means, said connecting means comprising a pivot connecting the body of said first brace means with said bed, said pivot protruding laterally from said bed and in pivotal and slidable engagement with said cam surface, and a stud attached to the end of said arcuate arm of said first brace means, said stud protruding laterally from said arcuate arm and in pivotal and slidable engagement with said cam surface, pivotal motion of said bed being translated by sliding and pivotal motion of said connecting means into axially displacing motion of said lens-mounting means from said housing in conformance with a configuration of said cam surface.

6. An apparatus for reversibly extending camera elements from one another according to claim 5, wherein said lens-mounting means includes means for limiting the forward mobility of said lens-mounting means and wherein said camera bed includes means for engaging said limiting means.

7. An apparatus for reversibly extending camera elements from one another according to claim 5, wherein said lens-mounting means comprises a fork attached thereto and extending therefrom, and wherein said bed includes a stop pin upon which said fork is adapted to be engageable, engagement of said fork upon said stop pin limiting the forward mobility of said lens-mounting means.

8. An apparatus for reversibly extending camera elements from one another according to claim 5, wherein said first brace means is shaped to provide a nose adapted to be strikeable upon said lens-mounting means at a predetermined position whereby vertical stability of said lens-mounting means is maintained.

9. An apparatus for reversibly extending camera elements from one another according to claim 5, wherein said second brace means is shaped to provide a resilient arm integral therewith and extending parallel to the long axis thereof, said arm being strikeable against interior portions of said housing and being under lateral compression at a predetermined position against said housing.

10. In a camera, a combination comprising a camera housing, a camera bed attached thereto, lens-mounting means, an extensible bellows connecting said housing to said lens-mounting means, an erecting means for reversibly translating pivotal motion of said bed into an axial displacement of said lens-mounting means with respect to said housing, said erecting means comprising a first element pivotally attached to said housing and being provided with a guide means integral therewith, a second element pivotally attached to said lens-mounting means and being provided with an arm integral therewith, connecting means in pivotable and slidable engagement with said guide means for connecting said first element to said second element, said connecting means comprising a first connector attached to said arm of said second element and responsive to said guide means, and a second connector about which said second element is pivoted, said second connector being responsive to said guide means.

11. In a camera, a combination comprising a camera housing, stop tabs disposed upon the interior walls of said housing, a camera bed pivotally attached to said housing, a bed covering attached to the exterior surface of said bed, lens-mounting means, an extensible bellows connecting said housing to said lens-mounting means, and erecting means for reversibly translating pivotal motion of said bed into an axial displacement of said lens-mounting means with respect to said housing, said erecting means comprising a brace pivotally attached to said lens-mounting means, said brace being shaped to provide a nose strikeable upon said lens-mounting means at a predetermined position, said brace being shaped to provide a resilient arcuate arm integral therewith and being separated therefrom by a slit, a pivot connecting said brace to said bed, said brace being movable about said pivot, a strut pivotally attached to said housing, said strut being shaped to provide a resilient arm integral therewith and extending parallel to the long axis thereof, said arm being strikeable against said stop tabs, said arm being capable of being under lateral compression thereagainst at a predetermined position, said strut being provided with an arcuate guide slot in the body thereof, said guide slot terminating in a V-shaped foot, connecting means in pivotal and slidable engagement with said guide slot for connecting said brace and said strut, said connecting means comprising said pivot and a stud attached to the end of said resilient arm of said brace, a fork attached to said lens bed and extending forwardly therefrom, a stop pin attached to said bed and disposed to be engageable with said fork, spring means attached to said bed and engageable upon said housing and latching said bed to said housing, disengagement of said spring means unlatching said bed from said housing and permitting a pivotal motion of said bed with respect to said housing, said pivotal motion being translated by said erecting means by the motion of said pivot and said stud in conformance with the configuration of said guide slot into an axial displacement of said lens-mounting means with respect to said housing.

12. For use with a camera comprising a camera housing, a camera bed pivotally attached thereto and lens-mounting means, a camera erecting system comprising, in combination, a first element pivotally attached to said housing and being provided with a cam surface, a second element pivotally attached to said lens-mounting means and pivotally attached to said bed, connecting means in pivotable and slidable engagement with said cam surface for connecting said first element to said second element, said connecting means comprising a first cam follower attached to said second element and responsive to said cam surface, and a second cam follower about which said second element is pivoted, said second cam follower being responsive to said cam surface.

References Cited in the file of this patent

UNITED STATES PATENTS

| | | |
|---|---|---|
| 1,826,243 | Fuerst | Oct. 6, 1931 |
| 1,937,053 | Bornmann et al. | Nov. 28, 1933 |

FOREIGN PATENTS

| | | |
|---|---|---|
| 563,237 | Germany | Nov. 3, 1932 |